US012545984B2

(12) United States Patent
Junge et al.

(10) Patent No.: US 12,545,984 B2
(45) Date of Patent: Feb. 10, 2026

(54) SURFACE MODIFICATION OF A ZINC-BASED METAL COATING IN A HOT-DIP COATING PROCESS

(71) Applicant: ThyssenKrupp Steel Europe AG, Duisburg (DE)

(72) Inventors: Fabian Junge, Wesel (DE); Burak William Centinkaya, Dortmund (DE)

(73) Assignee: ThyssenKrupp Steel Europe AG, Duisburg (DE)

(*) Notice: Subject to any disclaimer, the term of this patent is extended or adjusted under 35 U.S.C. 154(b) by 0 days.

(21) Appl. No.: 18/278,328

(22) PCT Filed: Feb. 24, 2022

(86) PCT No.: PCT/EP2022/054648
§ 371 (c)(1),
(2) Date: Aug. 22, 2023

(87) PCT Pub. No.: WO2022/184545
PCT Pub. Date: Sep. 9, 2022

(65) Prior Publication Data
US 2024/0141470 A1    May 2, 2024

(30) Foreign Application Priority Data
Mar. 4, 2021   (DE) .................. 102021105210.6

(51) Int. Cl.
| *C23C 2/06* | (2006.01) |
| *B32B 15/01* | (2006.01) |
| *C21D 8/02* | (2006.01) |
| *C21D 8/0278* | (2026.01) |
| *C21D 9/46* | (2006.01) |
| *C23C 2/26* | (2006.01) |
| *C23C 2/40* | (2006.01) |
| *C23C 22/07* | (2006.01) |
| *C23C 22/83* | (2006.01) |
| *C23G 1/19* | (2006.01) |

(52) U.S. Cl.
CPC .............. *C23C 2/06* (2013.01); *C21D 8/0278* (2013.01); *C21D 9/46* (2013.01); *C23C 2/261* (2022.08); *C23C 2/40* (2013.01); *C23C 22/07* (2013.01); *C23C 22/83* (2013.01); *C23G 1/19* (2013.01)

(58) Field of Classification Search
CPC .............. C23C 2/06; C23C 2/40; B32B 15/01
USPC ........................................................ 428/659
See application file for complete search history.

(56) References Cited

U.S. PATENT DOCUMENTS

| 2013/0288073 A1 | 10/2013 | Jeong et al. |
| 2015/0125714 A1 | 5/2015 | Amorim et al. |
| 2015/0329952 A1 | 11/2015 | Machado Amorim et al. |
| 2018/0002797 A1 | 1/2018 | Oh et al. |

FOREIGN PATENT DOCUMENTS

| CN | 103517995 A | 1/2014 |
| CN | 104364411 A | 2/2015 |
| CN | 107223166 A | 9/2017 |
| CN | 108018513 A | 5/2018 |
| CN | 110835757 A | 2/2020 |
| DE | 19951133 A1 | 4/2001 |
| EP | 2824213 A1 | 1/2015 |
| KR | 20100075185 A | 7/2010 |
| KR | 20150074975 A | 7/2015 |
| WO | 2005028695 A1 | 3/2005 |
| WO | 2019005989 A1 | 1/2019 |

OTHER PUBLICATIONS

Dissertation: L. Kotte 2015, Großflächige Oberflächenmodifizierung mittels Plasmatechnologie bei Atmosphärendruck.
Duchoslav, J. et al., "Nanoscopic view on the initial stages of corrosion of hot dip galvanized Zn—Mg—Al", Corrosion Science, Oxford, GB, Feb. 22, 2014.
Duchoslav, J. et al., "The effect of plasma treatment on the surface chemistry and structure of ZnMgAl coatings", Applied Surface Science, Oct. 28, 2019.
International Search Report and Written Opinion for International Application No. PCT/EP2022/054648 mailed May 16, 2022.
Mustafa, H. et al., "Influence of the pulse duration at near-infrared wavelengths on the laser-induced material removal of hot-dipped galvanized steel", Journal of Laser Applications, American Institute of Physics, Apr. 9, 2020.
Shigeyoshi Maeda, "Review paper: Surface chemistry of galvanized steel sheets relevant to adhesion performance", Process in Organic Coatings, Jan. 1, 1996.
Chinese Office Action and Search Report for CN Application No. 202280018905.4 mailed Apr. 11, 2025.

*Primary Examiner* — Katherine A Christy
(74) *Attorney, Agent, or Firm* — RMCK Law Group PLC

(57) ABSTRACT

A striplike or sheetlike steel substrate is hot-dip-coated with a metallic coating based on zinc and has a modified surface. A method includes producing a semifinished product with modified surface. The method includes at least regionally modifying the surface of a coated, skin-pass-rolled, oiled and cleaned metallic steel substrate by an atmospheric-pressure plasma treatment of surface regions with oxygen, air, forming gas or a mixture of two or more of these gases as process gas.

14 Claims, 1 Drawing Sheet

SURFACE MODIFICATION OF A ZINC-BASED METAL COATING IN A HOT-DIP COATING PROCESS

CROSS-REFERENCE TO RELATED APPLICATIONS

Figure 1:
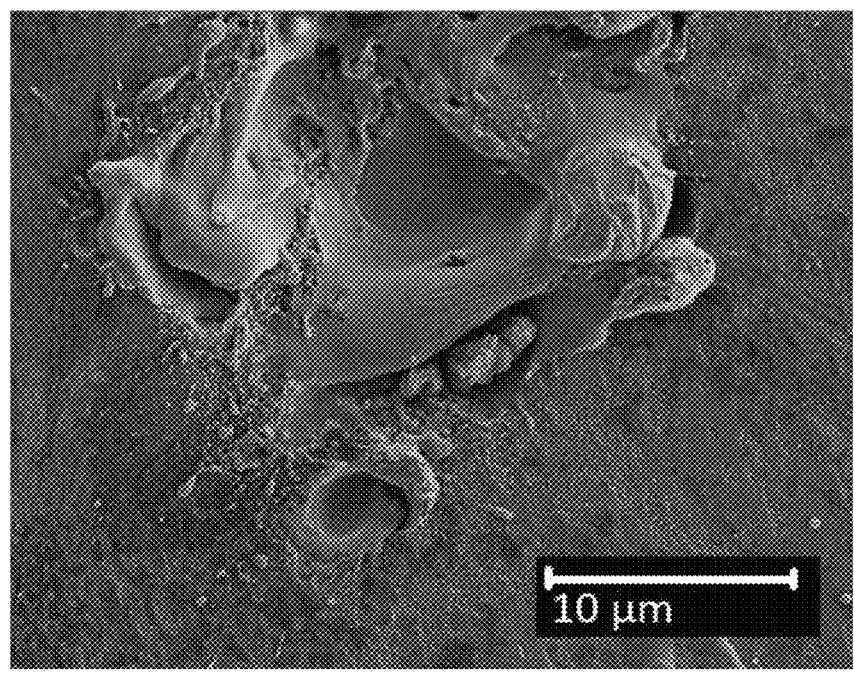

This application is a 371 U.S. National Stage of International Application No. PCT/EP2022/054648 filed Feb. 24, 2022 which claims the benefit of German Patent Application No. 10 2021 105 210.6 filed Mar. 4, 2021. The disclosures of each of the above applications are incorporated herein by reference in their entirety.

The invention relates to a striplike or sheetlike steel substrate hot-dip-coated with a metallic coating based on zinc and having a modified surface, and to a method for producing a semifinished product with modified surface, comprising at least one method step of at least regionally modifying the surface of a coated, skin-pass-rolled, oiled and cleaned metallic steel substrate by means of atmospheric-pressure plasma treatment of said surface regions with oxygen, air, forming gas or a mixture of 2 or more of these gases as process gas. The invention further relates to the accordingly produced semifinished products and/or flat steel products, optionally formed semifinished products and/or flat steel products, and to their use.

The addition of alloy elements to hot-dip coatings has a great effect on the chemical composition in the near-surface layer. The composition of the near-surface layer in turn has a large influence on the process steps of further processing such as pretreatments, adhesive bonding, phosphating and/or coating.

If new materials systems or surface systems are introduced, the near-surface composition may mean that they are not optimally covered by the existing process window, in an automotive process, for example. This may in turn negatively impact properties such as coating adhesion or the fracture characteristics of bonded surfaces, with the consequence that new materials/surfaces cannot be employed or that existing process windows have to be adapted, causing inconvenience.

In the case of zinc-based coatings, furthermore, oxide and/or hydroxide layers of zinc and/or of the further alloy elements of the coating are formed, as part of the process, on the surface of the coating.

Known from the prior art are various approaches to modifying these near-surface layers. EP 2 824 213 A1 discloses a method for improving the adhesiveness on a steel sheet provided with a Zn—Al—Mg-based protective coating, wherein the natural, Al2O3—and MgO-containing oxide layer is modified by application of a sodium fluoride-based aqueous composition, without stripping said oxide layer. In US 2015125714 A, a layer of magnesium oxide or magnesium hydroxide of a Zn—Al—Mg-based coating is modified by applying an acid solution to the outer surfaces and/or by applying mechanical forces using a roll dressing machine, a brushing apparatus or a sandblasting apparatus. For wet-chemical methods, these approaches are relatively complicated in terms of workplace safety and environmental protection. In the case of the mechanical approaches, the apparatuses required are relatively complicated.

Ideally, materials and surface systems must integrate into the standard process equally both for typical automotive processes and for the coil coating process.

Plasma treatment is a known solution for the cleaning and activating of surface components ahead of their onward processing. Cleaning, oxide reduction and pretreatment of a metal substrate by plasma treatment are available commercially. Typical metals stated are aluminum, aluminum/magnesium alloys, stainless steel, copper alloys or silver alloys. A surface-disposed oxide layer per se, however, is not attacked or significantly modified in its chemical composition.

It is an object of the invention, therefore, to overcome the above-stated disadvantages of the known methods and to provide an alternative to the methods employed to date, that can be carried out with existing processes and process windows. The method, furthermore, is to be optimized for metal coatings based on zinc.

A further intention is to provide an alternative by aftertreatment method for steel substrates hot-dip-coated with a metallic coating based on zinc, which in a single-stage process step alters the surfaces of the coatings such as to ensure, relative to an untreated control, improved adhesion of adhesives and/or coating layers.

A further object is to provide corresponding substrates, hot-dip-coated with a metallic coating based on zinc, which, relative to a control not treated in accordance with the invention, exhibit improved adhesive-bonding and coating properties, particularly in terms of the adhesion.

This object is achieved by the steel substrate having the features of claims 1 and 2, and by the method having the features of claim 6.

The present invention relates accordingly to a striplike or sheetlike steel substrate, hot-dip-coated with a metallic coating based on zinc, which in the surface-located atomic monolayer has surface modifications in the form of round, zinc-rich areas having a diameter of 20-300 µm. The surface modification, i.e., the round, zinc-rich areas, preferably has a diameter of at least 20 µm, 25 µm, 30 µm, preferably at least 35 µm, 40 µm, more preferably at least 45 µm, more particularly at least 50 µm, and at maximum a diameter of 300 µm, 275 µm, 250 µm, preferably a maximum diameter of 240 µm, 220 µm, 200 µm, more preferably a maximum diameter of 190 µm, 180 µm, 170 µm, 160 µm, more particularly a maximum diameter of 150 µm, 140 µm, 130 µm or 120 µm.

The surface, more particularly the surface-located atomic monolayer, is characterized using what is called ToF-SIMS (Time-of-Flight Secondary Ion Mass Spectrometry). Here the concentration of zinc and of any further alloy elements of the coating such as magnesium and/or aluminum is conveyed by the respective signal intensities and is determined and considered relatively via ToF-SIMS.

Relative concentrations determined via ToF-SIMS are measured by scanning grid-wise the ZM surface within a representative measurement area (5×5 mm$^2$). At each position of the grid, a spectrum in the positive polarity is recorded and the raw signals for the main constituents of the coating such as Zn and optionally Mg and Al are recorded. The relative concentration of the element X, which in this case may either represent the element magnesium, zinc and aluminum, is obtained from the quotient [X-raw signal integral/(Zn raw signal integral+Mg raw signal integral+Al raw signal integral)].

Here, in this definition "raw signal" denotes the peak area and "raw signal integral" represents the integrated intensity over all grid positions, which is assigned to the respective element. In accordance with the invention, the ToF SIMS measurements takes place by means of a TOF.SIMS 5 instrument from ION-TOFF GmbH.

In accordance with the invention, the relative concentrations of the alloy elements of the coating, such as of zinc, aluminum and magnesium, for example, is determined by determination of the absolute concentration of these elements and subsequent normalization to 100%; here, the sum of the concentration of the particular alloy elements is set as 100 and the fraction of the respective alloy element is rated or weighted in this 100% as a relative concentration, in other words based on 100%. The relative concentration of an element (for example, Al, Mg or Zn) is therefore based on the sum of the concentrations of all the particular elements, with this sum representing 100%.

Because the absolute concentration of the alloy elements, such as Al, Mg and Zn for example, may vary from coating to coating, it is stated in accordance with the invention, for the method to be employed generally, as a relative concentration and in percentage points, in order to give a precise definition of the changes.

Here, the occurrence of the alloy elements—for example and in particular, zinc, magnesium and aluminum—in the sense of the invention is captured independently of the form in which these elements are present; accordingly, it is immaterial whether these elements are present as neutral atoms or as ions, in an assembly such as, for example, alloy or intermetallic phases, or in a compound such as, for example, complexes, oxides, salts, hydroxides or the like. Accordingly, the terms "zinc", "aluminum" and "magnesium" in the sense of the invention may encompass not only the elements in pure form but also, additionally, oxidic and/or hydro oxidic or any form of compounds containing these elements. The same is true, by analogy, of further elements of the alloy in the coating.

The zinc-rich areas on the surface of the substrates are characterized via the corresponding imaging of the ToF-SIMS method. In this case, the images of the signal intensities for the various elements analyzed (for example, Zn, Mg and/or Al) are superimposed on one another. The substrates of the invention carry round, preferably substantially circular, areas in which zinc within this area has a relative concentration of more than 7%, preferably 10%, 12%, 15%, 20%, more preferably 25%, 40%, 60%, more particularly 70%, 90% or more.

A further subject of the present invention is a striplike or sheetlike steel substrate, hot-dip-coated with a metallic coating based on zinc, which in the surface topography has surface modifications in the form of craters having a diameter of 0.2-30 μm as determined via SEM micrograph. The diameters of the craters are determined optically via SEM micrographs, since macroscopically they are unrecognizable. The diameter is at least 0.2 μm, 0.25 μm, 0.5 μm, preferably at least 0.75 μm, more preferably at least 1 μm, more particularly at least 2 μm and at maximum 30 μm, 28 μm, 26 μm, preferably at maximum 25 μm, 24 μm, 23 μm, 22 μm, 21 μm, more preferably at maximum 20 μm, 19 μm, 18 μm, 17 μm, 16 μm, more particularly at least 15 μm, 14 μm, 13 μm or 12 μm.

The craters are funnellike depressions in the surface topography of the coating with the dimensions described above. These are local fused regions, generated by the hitting or striking of high-energy particles. These depressions, accordingly, may be referred to as impact craters.

In one embodiment of the invention, the zinc-rich areas and the craters represent the same surface modification, characterized only by different methods and analytical techniques. In this sense, both the zinc-rich areas and the craters are referred to as surface modifications.

The surface modifications in the sense of the invention are generated by impact (striking) of charge carriers, preferably of a plasma with oxygen, air, forming gas or a mixture of 2 or more of these gases as process gas. In fact, between the cathode and the substrate, a voltage and/or current strength is applied with a magnitude such that the charge carriers discharge in peaks at the grounded substrate surface. As a result, the characteristic impacts already described occur. Rather than either layer-wise ablation or a stripping of the upper layer or layers of a hot-dip coating, these features are pointwise, local modifications, preferably in the form of depressions, which in comparison to a control have a different composition of the surface-located atomic monolayer and/or of a surface-bordering layer with a thickness equal to the typical XPS information depth.

In accordance with the invention, the XPS measurement takes place with an instrument: Phi Quantera II SXM Scanning XPS Microprobe from Physical Electronics GmbH. (The instrument has the following general instrument parameters: working pressure in main chamber: <1×10-6 Pa; lock pressure: <2.7×10–4 Pa; x-ray source: Al 1486.6 eV, monochromatic; maximum sample size: 70 mm×70 mm×15 mm (height); neutralizing agents: Ar and electrons; neutralization voltage: 1.5 V; neutralization current strength: 20.0 μA; beam diameter: 100 μm; pass energy: 280 eV; spectral resolution: 1 eV.) In one alternative of the invention, the typical XPS information depth corresponds to a layer having a thickness of substantially 5 nm.

For the purposes of the invention, the term "substantially corresponding to" or "substantially equal to", or equivalent statements, denotes a deviation from a particular, mandated value, or a difference between 2 values, of not more than 50%, 45%, 40%, preferably 30%, 25%, more preferably 20%, 19%, 18%, 17%, 16%, 15%, 14%, 13%, 12%, 11%, more particularly 10%, 9%, 8%, 7%, 6%, 5%, 4%, 3%, 2%, 1% or 0.5%, 0.1%.

For the purposes of the invention, the layer thickness or the depth of a layer is always determined from the topmost atom of the respective surface.

In accordance with the invention, the terms "region" and "area" and respective derivations thereof (such as, for example, "regionally" etc.), are not used as synonyms.

A striplike steel substrate refers in accordance with the invention to a substrate which may be provided in the form of a strip, wound up as a coil, for example. A sheetlike substrate is a flat, typically rolled substrate whose thickness is substantially less than its width or length; more particularly, steel strips, steel sheets and cut shapes obtained from them, such as blanks and the like. According to the present invention, the semifinished product is subjected to further method steps, including, for example, forming steps. A steel substrate is a substrate composed of steel.

In one embodiment, the steel substrate is coated with a metallic coating, based on Zn, ZnMg, ZnAl and/or ZnMgAl. In one alternative, a hot-dip bath particularly suitable for the purposes of the invention, and a corresponding metallic coating on the substrate, comprises or consists of Zn and unavoidable impurities. In another alternative, a hot-dip bath and a corresponding metallic coating comprises or consists of between 0.1 and 10.0 wt % of magnesium and/or between 0.1 and 20.0 wt % aluminum, preferably at least 0.3 wt %, 0.5 wt % of magnesium, more preferably 1.0 wt % of Mg, more particularly 2.0 wt % of Mg and not more than 4.0 wt % of magnesium, more preferably 3.0 wt % of Mg, more particularly 2.5 wt %, 2.0 wt % of Mg and/or at least 0.5 wt % of Al, more preferably 0.7 wt % of Al, 1.0 wt % of Al, more particularly 2.0 wt % of Al and not more than 11.0 wt % of Al, more preferably 6.0 wt % of Al, 4.0 wt % of Al, 3.0 wt % of Al, more particularly 2.0 wt % of Al, with Zn and unavoidable impurities as the balance. The Mg/Al mass ratio is preferably less than or equal to 1, more preferably less than 0.9.

In a further alternative, the hot-dip bath and the corresponding metallic coating may comprise up to 0.3 wt % of each of the optional additive elements, selected from the group comprising or consisting of Si, Sb, Pb, Ti, Ca, Mn, Sn, La, Ce, Cr, Ni, Zr and Bi. Additionally, there may also be residues of other elements present, which originate from the preceding steps, for example, or unavoidable impurities.

The concentrations of the individual elements in the coating differ in near-interface layers from the concentrations in the hot-dip bath. Particularly in near-surface layers such as the reaction layer, the individual elements are present in a ratio which differs from that of the hot-dip bath.

In the alternatives with an Mg-containing coating based on Zn, the magnesium-rich oxide layer in particular, in combination with the components of the oil, more particularly esters, ensures a poor wetting behavior of process media in the further surface treatment steps.

To enable sufficient corrosion control, according to one configuration, the zinc-based coating of the steel substrate has an add-on of at least 20 g/m2, preferably 30 g/m2, 40 g/m2, 50 g/m2, 60 g/m2, 70 g/m2, 80 g/m2, 90 g/m2, 100 g/m2 or 120 g/m2, more particularly of at least 40 g/m2 up to a maximum of 300 g/m2, 200 g/m2, preferably 150 g/m2, more preferably 120 g/m2, 100 g/m2, more particularly 90 g/m2, 80 g/m2 per side on one or both sides, preferably over the whole area. Thus coatings with a thickness of at least 0.5 µm, 1.0 µm, 2.0 µm or 3.0 µm, preferably 4.0 µm, 5.0 µm or 6.0 µm, more particularly of at least 7.0 µm, 8.0 µm, 9.0 µm or 10.0 µm up to a maximum of 10.0 µm, 12.0 µm, 15.0 µm, 20.0 µm, preferably 25.0 µm, 30.0 µm, more preferably 35.0 µm, 40.0 µm, more particularly 50.0 µm or more per side are applied on one or both sides, preferably over the whole area.

A further embodiment relates to the above-described, hot-dip-coated steel substrate which has per $mm^2$ at least 10 surface modifications, at least 12, preferably 15, 20 or 25, more particularly at least 30, 40 or 50, more particularly at least 75 or 100 surface modifications per $mm^2$ up to a maximum of 15, preferably a maximum of 50, 100, 250, 500, 1000, 10000, 100000 or 300000, more preferably not more than over the whole area, in the corresponding treated region.

In a further embodiment, the substrate has an at least regionally plasma-treated modified surface. Modification of the surface by a plasma treatment may take place only regionally with respect to the overall surface area of the substrate, on one side of the striplike or sheetlike substrate or on both sides. The treatment takes place preferably in particular, pre-defined regions or on one side of the substrate. In one alternative, the treatment is over the whole area, meaning that the modifications extend over the entire area of a region, of one side or both sides of the substrate.

The plasma treatment takes place at atmospheric pressure, i.e., at a pressure (air pressure) of at least 750 mbar, preferably 800 mbar, 850 mbar, 900 mbar, more preferably 950 mbar, more particularly 1000 mbar and not more than 1100 mbar, preferably 1070 mbar, 1050 mbar, more preferably 1030 mbar, more particularly 1020 mbar.

Process gas used in accordance with the invention, in one alternative, is air, oxygen, forming gas or a mixture of 2 or more of these gases. Where air is used as process gas, the treatment in the sense of the invention is a plasma treatment in the atmosphere without addition of further process gases. The use of a mixture of air and oxygen denotes a plasma treatment in the atmosphere with oxygen enrichment. Where forming gas is used as process gas, the gas mixture used in the sense of the invention is a mixture of nitrogen and hydrogen, alternatively argon and hydrogen. The forming gas used is preferably a gas mixture of nitrogen and hydrogen, with a hydrogen fraction of 1-30%, preferably 1-20%, more preferably 1-10%, more particularly 1-5% hydrogen, the balance being nitrogen. Corresponding gas mixtures are available commercially.

The plasma treatment at atmospheric pressure is based on the application of the plasma to a substrate via apparatuses, referred to as nozzles. The application area of an individual such apparatus, nozzle, is understood in the sense of the invention to be an areal region on the substrate on which the plasma impinges. The treatment time t per unit application area is at least 0.1 second, 0.5 seconds, preferably 1, preferably 5, 10, 20, more particularly 30 seconds and not more than 300, 180, more preferably 120, 60 seconds, more particularly 30, 20, 10, 5, 3, or 1 second. In one alternative, the treatment time t is defined via the rate of advance of the apparatus or of the substrate and is at least 0.1 m/min, 1 m/min, preferably 2, 3 m/min, more preferably 15, 20 m/min, more particularly 30 m/min and not more than 20, 30 m/min, preferably 35, 40, 45, 50, 60 m/min, more preferably 70, 80, 90 or 100 m/min.

Additionally, the plasma treatment is defined by one or more of the following features of the generator used:
- a power P of at least 0.5, preferably 1.0 or 2.0, more preferably 3.0 or 4.0, more particularly 5.0 kW and not more than 100.0, 75.0, or 50.0, preferably 25.0 or 20.0, more preferably 15.0, more particularly 10.0 kW;
- a frequency f of at least 5 or 10, preferably 15, more preferably 18, more particularly 20 kHz and not more than 100, preferably 80, more preferably 50, more particularly 40 kHz;
- a current strength I of at least 1.00 A, preferably 5.00 or 10.00, more preferably 15, more particularly 20.00 A and not more than 50.00 or 40.00 A, preferably 30.00 or, more preferably 25.00, more particularly 22.00 A, and
- a voltage U of at least 100 V or 250 V, preferably 250, more preferably 280 V, more particularly 300 V, and not more than 500 V, preferably 480, more preferably 450, more particularly 420 V.

One embodiment of the invention relates to the plasma-treated substrate described above, wherein the relative area fraction of the zinc signal in the surface-located atomic monolayer, as determined via ToF-SIMS, in the modified region is at least 10%. This means that over the entire plasma-treated, modified areal region, i.e., that region of the surface of the substrate that was subject to the charge carriers of the plasma, the fraction of zinc in the surface-located atomic monolayer, as determined via ToF-SIMS, is at least 10%, 12% or 15%, preferably 20% or 25%, more preferably 30% or 40%, more particularly 50%, 60% or 70%, ideally more than 75%.

Another subject of the invention is a method for producing a striplike or sheetlike steel substrate hot-dip-coated with a metallic coating based on zinc and having a surface modified, relative to a control, by means of a plasma treatment described above. The control for the purposes of the invention is a hot-dip-coated substrate which including the coating is identical to the sample being used in accordance with the invention, meaning that the control, apart from the plasma treatment, has undergone the same processes and production steps and prior to the plasma treatment has the same properties. The only difference between the control and the substrate used in accordance with the invention is that the control is not subjected to the plasma treatment for use in accordance with the invention.

The method of the above-described plasma treatment may be transposed in general to hot-dip-coated steel strip. After the hot-dip coating, the alloy elements of the coating that have affinity for oxygen diffuse the surface, where they form an oxide layer which, as in the case of the magnesium, may negatively impact subsequent processes. In the case of a Z-coating, the oxide layer which forms and the near-surface metallic phases consist primarily of aluminum, which has greater oxygen affinity than zinc. In this case as well, a treatment of the surface in accordance with the invention reduces aluminum fractions at the surface, replacing them with zinc.

Another subject of the invention is a method for producing a semifinished product with modified surface, which comprises the following method steps:

I. Providing a striplike or sheetlike steel substrate,
II. At least regionally applying a double-sided metallic coating based on zinc by hot-dip coating,
III. Skin-pass-rolling preferably the coated region of the metallically coated substrate from step II,
M. At least regionally modifying the surface of the substrate from step II or III via an atmospheric-pressure plasma treatment of said surface regions with air, oxygen, forming gas or a mixture of 2 or more of these gases as process gas after step II and/or III,
Optionally I V. oiling preferably the skin-pass-rolled region of the skin-pass-rolled metallically coated substrate, modified via plasma treatment.

For the application of a double-sided metallic coating based on zinc, a substrate is generally prepared, cleaned for example, preferably in a continuous annealing furnace. In the front, oxidizing part of said furnace, residues of oil and dirt are removed and the steel surface acquires a thin oxide layer. In the downstream, reducing part of the furnace, this oxide layer is removed of hydrogen by reduction. This furnace annealing produces a recrystallization, which also tackles the strengthening of the cold-rolled material. The strip is subsequently brought to the temperature of the metal melt and prepared in step I for the coating.

In the following step II, the strip is hot-dip-coated by passing it through a molten liquid metal bath. The desired coating thickness is adjusted with a nozzle stripping method. The coatings are subsequently cooled in a controlled manner, with the coating optionally being quenched after the bath. On coating, diffusion of the liquid zinc and any further metals of the coating with the steel surface forms a coating on the steel part composed variously of iron-zinc alloy layers or iron-zinc alloy layers containing further metals. On the topmost alloy layer there is a pure layer consisting of the pure coating, i.e. without iron diffusion. In one alternative, the composition of the pure layer corresponds to that of the applied melt.

Following the solidification of the metallic coating, the coated substrate in step III is skin-pass-rolled and optionally straightened by stretching or by stretching and bending. The extension rate is typically in the range from 0.3 to 5%. As a result, the surface topography and the composition of the coating in the near-surface layers are defined. The surface topography refers in particular to a profile characterized for example by roughness, peak number, and waviness. In one alternative, a surface aftertreatment takes place.

Step II and/or III is followed in step M by modification of the surface by a plasma treatment as described above. One embodiment concerns the method of the invention, wherein the plasma treatment M takes place in line. This means that step M takes place in the hot-dip coating unit (also called hot-dip finishing unit). The hot-dip coating unit therefore has an apparatus for atmospheric-pressure plasma treatment with air, oxygen, forming gas or a mixture of 2 or more of these gases as process gas.

In one alternative, as a further step IV, the substrate is oiled, i.e. is given a surface protection.

In the sense of the invention, the oiled substrate of step IV has a near-surface layer sequence as follows:
1—Pure layer;
2—Reaction layer;
3—Optionally sorption layer;
4—Optionally contamination layer.

The pure layer 1 is the above-described pure layer consisting of the pure coating and possibly unavoidable impurities such as iron, for example.

The reaction layer 2, having a thickness of 1-100 nm, preferably 50-100 nm, consists of reaction products of the pure layer and is formed by reaction of metals at the surface and possibly the nearest underlying atomic layers of the pure layers on contact with the atmosphere. Accordingly, the reaction layer comprises substantially metal oxides and/or metal hydroxides. Additives as well, lubricants for example, may be incorporated into the reaction layer; there may additionally be sulfides and/or carbonates present.

The reaction layer transitions into a sorption layer 3, having a thickness of 0.1-100 nm. This layer comprises accumulations of substances or of colloids or of particles in a phase-boundary region, between the solid phase of the reaction layer 2 and the surrounding atmosphere as gas phase. This sorption layer 3 is rich in carbon (from hydrocarbons) and in oxygen, and comprises or consists substantially of organic substances, especially esters of carboxylic acids, and optionally water. The substances or colloids or particles of the sorption layer cannot be removed with a simple chemical, non-reactive cleaning, since they are substances extraneous to the material that are more difficult to remove than the impurities in the subsequent contamination (impurities) layer.

The following, outermost layer is the contamination layer 4. With a thickness of at least 0.1 μm, preferably at least 1 μm, more preferably 10 μm up to not more than 100 μm, it contains contaminants intended for removal, such as, for example, dirt, manufacturing residues and/or previously applied greases and/or oils.

For the further working of the substrate to produce a semi-finished product, or further production of semi-finished items or ready-made parts, such as CC or phosphating, for example, it is necessary for the substrate to be cleaned in a step V. The cleaning improves the wettability of the metallic coating with aqueous media. In one alternative, wet-chemical cleaning is carried out. Alkaline, preferably mild alkaline, cleaning agents or organic solvents are used. In one alternative, one or more agents are used that are selected from the group comprising or consisting of the following: mild-alkaline cleaning agents having a pH of 9 to 11, preferably 9.5 to 10.5; strongly alkaline cleaning agents having a pH of 12 to 14, preferably 12.5 to 13.0; n-heptane, methyl ethyl ketone, tetrahydrofuran, isopropanol, ethanol, wash benzine (also referred to as white spirit) or a mixture of two or more of the stated substances; preference is given to a mixture of n-heptane with tetrahydrofuran or a mixture of n-heptane with ethanol.

In one alternative, this cleaning is a degreasing.

Furthermore, in one alternative, this cleaning step substantially removes the contaminants in the contamination layer, hence substantially ablating the contamination layer.

Nevertheless, residues of oil and/or grease, or components thereof, may remain on the substrate, especially in the sorption layer.

Cleaning takes place by a spraying or dipping method or in the form of strip coating. Cleaning may take place only regionally with respect to the overall surface of the substrate, on one side of the striplike or sheetlike substrate, or on both sides. The treatment takes place preferably in particular, predefined regions or on one side of the substrate, i.e., over the entire area of one side, hence over the whole area.

A characteristic of the surface modification of the invention through plasma treatment is the change in the chemical composition of the reaction layer 2 (see above). In other words, the plasma treatment changes the respective fractions of metals, their oxides and/or hydroxides. In particular, the surface topography is changed, with the change taking place on a microscopic scale and being detectable, for example, by means of ToF-SIMS, XPS or SEM.

In a further embodiment of the invention, the striplike substrate after at least one of steps I, II, III, IV, V and/or VI is reeled to form a coil, to be supplied to the next operations, or is so supplied. For the implementation of the subsequent operation, the coil is correspondingly unreeled. The reeling and unreeling do not alter the results of the preceding steps, this thus being a further feature of the substrate or semifinished product.

One embodiment relates to the method which after oiling step IV—which in this embodiment may be referred to as IV.a—comprises an ageing step IV.b. The ageing step comprises one or more of the following sub-steps: distribution of the oil on the surface topography of the substrate, reeling, storage, transport to the customer, unreeling, etc. The ageing step lasts at least 0.5 hour, 1.0, 6.0, 12.0 or 24.0 hours up to a plurality of (at least 2) days, weeks, months or years. The influence of the ageing is relevant for the near-surface layers of the substrate, since in spite of oiling, an oxide layer (reaction layer-2-) of up to 200 nm may be formed. As a result, the metallic phases situated beneath this layer are likewise oxidized. A typical cleaning is therefore sufficient for later hydrophilic wetting over the whole area. Since the substrates and/or semifinished products of the invention have a modification through plasma treatment, the oxide layer is less Mg-rich but instead contains more Zn. Zinc-oxides can be removed more effectively by the alkaline cleaner systems used. Other process media as well operate more effectively on zinc-rich surfaces.

In one embodiment, after the cleaning in step V, a further surface treatment step VI takes place.

In one alternative, as further surface treatment step VI-i, a coil coating method is carried out.

For this purpose, after step V, initially a pretreatment for coil coating is carried out as step VI-i-a. The pretreatment comprises, for example, chemical passivation as known to the skilled person, or a different or further pretreatment, such as application of adhesion promoter, activating and/or passivating agent. The plasma treatment prior to the application of pretreatment media ensures improved wetting behavior of the respective pretreatment by comparison with a control without plasma treatment, and hence ensures stronger/more uniform attachment of the layers to be applied subsequently, such as a more stable coating system, for example.

The coil coating method is carried out subsequently as step VI-i-b. The coating, optionally in a plurality of layers such as, for example, primer, topcoat and/or clear coat, is applied by a roll method and baked at about 240° C. The coating may be protected by means of a liner film. Lastly, the continuous coated substrate/semifinished product is wound up to a coil. Alternatively, the coil may be separated into unit lengths, optionally prior to lining.

In one embodiment, the skin-pass rolling in step III is followed by modification of the surface of the skin-pass rolled substrate from III by means of at least regional plasma treatment of the surface in a step III-ii-a and optionally by a step III-ii-b of pretreatment and/or aftertreatment. This and the plasma treatment take place as described above.

A further embodiment relates to a method comprising the steps I to VI and optionally the step III-ii-a and optionally the step III-ii-b, in which, before the cleaning in step V—which in this embodiment may be referred to as V-ii-b —, at least one step V-ii-a is carried out, selected from the group of the methods comprising or consisting of cutting, forming, joining, degreasing, activating, phosphating, cathodic dip coating, and coating. Joining here may in turn be spot welding, adhesive bonding and laser soldering.

In this embodiment, in one alternative, as further surface treatment step VI-ii-a, after the cleaning V, activation of the surface is carried out. Here, the surface of the plasma-treated substrate is placed into a state which is capable of chemical reaction. The contact of the plasma-treated substrate with an acidic or alkaline medium causes metal ions to detach from the surface. They are then able to enter into compounds with constituents of the solution. Activation is frequently carried out using dilute phosphoric acid compounds or specific compounds which act like seed crystals. The activation is for the following phosphating, which takes place as further surface treatment step VI-ii-b in this alternative.

The subject of the invention is a semifinished product with modified surface, produced in a method as described above.

A further subject of the invention is the use of an atmospheric-pressure plasma treatment with air, oxygen, forming gas or a mixture of 2 or more of these gases as process gas for producing a modified surface of a substrate as described above, which in comparison to a control, after the plasma treatment, has a higher relative area fraction of the zinc signal, as determined by means of ToF-SIMS, in the surface-located atomic monolayer.

A further subject of the present invention is a method for increasing the relative concentration of zinc in the surface-bordering layer with a thickness equal to the typical XPS information depth, of a striplike or sheetlike steel substrate, hot-dip-coated with a metallic coating based on zinc, by modifying the surface via plasma treatment.

A plasma treatment with air, oxygen, forming gas or a mixture of 2 or more of these gases as process gas improves the wettability of metallically coated steel by aqueous media.

The improved wettability may be utilized for the coil coating process, to produce a more uniform coating outcome. Through the modification of the surface by a plasma treatment, it is possible to achieve a defect-free outcome when using the processes and instruments employed to date. The effect of the plasma treatment is beneficial for a host of aqueous chemical treatments, utilized both in the automobile process and the coil coating process.

In the sense of the invention, combinations of the embodiments and alternatives described above may also be used.

EXAMPLES

EXAMPLE 1

FIG. 1 shows an SEM micrograph of a substrate according to the invention after a plasma treatment as described above. Clearly apparent therein are the modifications in the form of craters.

EXAMPLE 2

Figure 2:
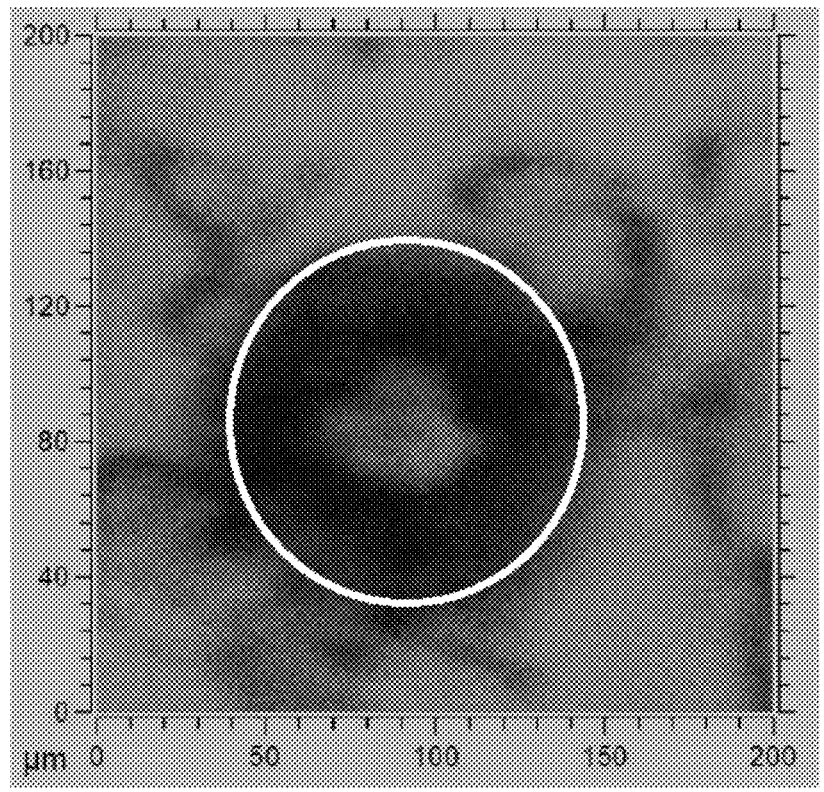

FIG. 2 shows what is called a ToF-SIMS mapping, in which the signal intensity distributions of magnesium, aluminum and zinc of a substrate according to the invention after a plasma treatment have been placed atop one another. In the black-and-white version present, the zinc-rich area is marked and is clearly evident as a dark area.

EXAMPLE 3

Investigation of the effect of the plasma treatment on substrates coated on a ZnMgAl basis. The fractions of Zn/Al/Mg were determined via XPS as described above and normalized to 100 at. %. The results are collated in Tab. 1 and clearly show the increase in the zinc fraction as a result of the plasma treatment.

The results, furthermore, correlate with the corresponding ToF-SIMS evaluations (ToF-SIMS mapping).

|  | Nozzle-substrate distance mm | Rate of advance m/min | Mg | Al | Zn |
| --- | --- | --- | --- | --- | --- |
| Control |  |  | 21 | 53 | 27 |
| V01 | 4-6 | 3 | 19 | 17 | 64 |
| V02 | 5-6 | 9 | 20 | 16 | 64 |
| V03 | 5-6 | 15 | 24 | 14 | 62 |
| V04 | 5-6 | 15 | 28 | 28 | 44 |
| V05 | 5-6 | 15 | 21 | 21 | 58 |
| V06 | 6-7 | 15 | 36 | 25 | 40 |
| V07 | 6-7 | 15 | 32 | 21 | 47 |
| V08 | 6-7 | 30 | 29 | 24 | 47 |
| V09 | 6-7 | 30 | 24 | 32 | 45 |

The invention claimed is:

1. A striplike or sheetlike steel substrate hot-dip-coated with a metallic coating based on zinc, with an at least regionally plasma-treated modified surface, which in a surface-located atomic monolayer has surface modifications in the form of round, zinc-rich local fused regions having funnellike depressions in the form of impact craters formed by impact of energetic particles due to kinetic energy and having a diameter of 30-300 μm, wherein the surface modifications comprise a minimum number of 20 surface modifications per mm$^2$.

2. A striplike or sheetlike steel substrate hot-dip-coated with a metallic coating based on zinc, which in the surface topography has surface modifications having funnellike depressions in the form of impact craters formed by impact of energetic particles due to kinetic energy and having a diameter of 0.2-30 μm as determined via SEM micrograph, wherein the surface modifications comprise local fused regions including a minimum number of 20 surface modifications per mm$^2$.

3. The substrate of claim 2, wherein the substrate at least regionally has a surface modified via plasma treatment.

4. The substrate of claim 3, wherein the relative area fraction of the zinc signal in the surface-located atomic monolayer, determined by ToF-SIMS, in the modified region is at least 15%.

5. The substrate of claim 1, wherein the relative area fraction of the zinc signal in the surface-located atomic monolayer, determined by ToF-SIMS, in the modified region is at least 15%.

6. The substrate of claim 1, wherein the plasma treated modified surface is modified with at least one of air, oxygen, forming gas as process gas.

7. The substrate of claim 3, wherein the plasma treated modified surface is modified with at least one of air, oxygen, forming gas as process gas.

8. The substrate of claim 1, wherein the surface modifications comprise a minimum number of 75 surface modifications per mm$^2$.

9. The substrate of claim 1, wherein the plasma treated modified surface includes a fraction of zinc in a surface-located atomic monolayer, as determined via ToF-SIMS of more than 75%.

10. The substrate of claim 1, wherein the plasma treated modified surface is oiled.

11. The substrate of claim 2, wherein the surface modifications comprise a minimum number of 30 surface modifications per mm$^2$.

12. The substrate of claim 2, wherein the surface modifications comprise a minimum number of 75 surface modifications per mm$^2$.

13. The substrate of claim 2, wherein the steel substrate is oiled.

14. The substrate of claim 1, wherein the metallic coating has magnesium and aluminum, wherein a magnesium to aluminum mass ratio (Mg/Al) is less than 1.

* * * * *